US011827149B2

(12) United States Patent
Lee et al.

(10) Patent No.: US 11,827,149 B2
(45) Date of Patent: Nov. 28, 2023

(54) SIDE CAMERA FOR VEHICLE AND CONTROL METHOD THEREFOR

(71) Applicant: HYUNDAI MOBIS CO., LTD., Seoul (KR)

(72) Inventors: Won Moo Lee, Yongin-si (KR); Hyung Min Kim, Yongin-si (KR); Hyun Seong Yoon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/478,872

(22) Filed: Sep. 17, 2021

(65) Prior Publication Data
US 2022/0118908 A1 Apr. 21, 2022

(30) Foreign Application Priority Data

Oct. 19, 2020 (KR) .................. 10-2020-0135261

(51) Int. Cl.
*H04N 7/18* (2006.01)
*B60R 1/00* (2022.01)
*B60K 35/00* (2006.01)
*G07C 5/08* (2006.01)
*H04N 5/262* (2006.01)
(Continued)

(52) U.S. Cl.
CPC .............. *B60R 1/00* (2013.01); *B60K 35/00* (2013.01); *G07C 5/0825* (2013.01);
(Continued)

(58) Field of Classification Search
CPC .......... H04N 7/18; H04N 5/232; H04N 5/247; H04N 5/2628; H04N 5/268; H04N 17/002;
(Continued)

(56) References Cited

U.S. PATENT DOCUMENTS 10,106,085 B2 * 10/2018 Kim .......................... B60R 1/00
10,198,639 B2 * 2/2019 Sung ......................... B60R 1/00
(Continued)

FOREIGN PATENT DOCUMENTS

KR 10-2105657 4/2020
WO WO 2016/178190 11/2016

OTHER PUBLICATIONS

Extended European Search Report dated Feb. 16, 2022 issued in EP Application No. 21200640.7.

*Primary Examiner* — Trang U Tran
(74) *Attorney, Agent, or Firm* — DLA PIPER LLP (US)

(57) ABSTRACT

A side camera for a vehicle comprises: a main body disposed at a left-hand and/or a right-hand side of the vehicle; a blind-spot view camera of which at least a portion is accommodated in the main body and being configured to photograph a view in lateral and rearward directions; a surround view camera (SVC) of which at least a portion is accommodated in the main body and being configured to photograph a view in a lateral direction; and a blind-spot view monitor disposed inside the vehicle to transmit an image captured by the blind-spot view camera. When the blind-spot view camera fails, an image transformation process is performed based on an image captured by the SVC and transmitted to the blind-spot view monitor. When the blind-spot view monitor fails, an image captured by the blind-spot view camera is transmitted to another display device in the vehicle.

10 Claims, 5 Drawing Sheets

(51) Int. Cl.
*H04N 5/268* (2006.01)
*H04N 17/00* (2006.01)
*H04N 17/04* (2006.01)
*H04N 23/90* (2023.01)

(52) U.S. Cl.
CPC ........... *G07C 5/0833* (2013.01); *H04N 5/268* (2013.01); *H04N 5/2628* (2013.01); *H04N 17/002* (2013.01); *H04N 17/04* (2013.01); *H04N 23/90* (2023.01); *B60K 2370/166* (2019.05); *B60K 2370/178* (2019.05); *B60R 2300/105* (2013.01); *B60R 2300/802* (2013.01); *B60R 2300/8046* (2013.01)

(58) Field of Classification Search
CPC .... H04N 17/04; B60R 1/00; B60R 2300/105; B60R 2300/802; B60K 35/00; B60K 2370/166; B60K 2370/178; G07C 5/0825; G07C 5/0833

USPC ........................................................ 348/148
See application file for complete search history.

(56) References Cited

U.S. PATENT DOCUMENTS

| | | |
|---|---|---|
| 10,953,811 B2 * | 3/2021 | Kim .................... B60R 11/0235 |
| 2013/0265431 A1 | 10/2013 | Hattori |
| 2014/0071278 A1 * | 3/2014 | Assaf ........................ B60R 1/12 |
| | | 348/148 |
| 2016/0165148 A1 * | 6/2016 | Itoh ........................ G06V 10/44 |
| | | 348/148 |
| 2017/0161566 A1 | 6/2017 | Sung |
| 2018/0134217 A1 | 5/2018 | Peterson |
| 2021/0024000 A1 | 1/2021 | Peterson |
| 2021/0300246 A1 | 9/2021 | Peterson |

\* cited by examiner (a)

(b)

(c)

SIDE CAMERA FOR VEHICLE AND CONTROL METHOD THEREFOR

CROSS-REFERENCE TO RELATED APPLICATION

This application claims priority to and the benefit of Korean Patent Application No. 10-2020-0135261, filed on Oct. 19, 2020, the disclosure of which is incorporated herein by reference in its entirety.

TECHNICAL FIELD

The present disclosure relates to a side camera for a vehicle and a method of controlling the same.

BACKGROUND

The content described in this section merely provides background information about the present disclosure and does not constitute the related art.

Side mirrors are installed at left-hand and right-hand sides of a vehicle in preparation for a situation in which it is necessary to monitor a rear side of the vehicle while driving. However, since the side mirrors protrude greatly from both sides of the vehicle, the side mirrors cause difficulties in parking or increase air resistance during driving to generate wind noise and reduce fuel efficiency of the vehicle. In addition, due to the structure of the side mirror, a blind spot, which is difficult to check with only a driver's field of view, occurs, and such a blind spot is one of the major causes of traffic accidents.

In order to solve such problems of existing side mirrors, there are conventional technologies for replacing the side mirror for a vehicle with a side camera. When a side mirror is replaced with a side camera, a free space at a side surface of a vehicle is increased during parking, and the side camera receives less wind resistance aerodynamically than the side mirror during driving of the vehicle so that fuel efficiency is improved. However, the conventional technologies are focused only on widening an angle of view of a rear side of the vehicle by replacing the existing side mirror with the camera, and thus, when the camera is disabled, it is difficult to secure a rear side field of view of the vehicle. A fatal accident may occur when a rear side field of view cannot be secured during driving of a vehicle. Therefore, it should be possible to secure a rear side field of view of a vehicle even when a camera is disabled.

SUMMARY

The present disclosure is directed to providing a rear side field of view to a user even when a blind-spot view camera or a blind-spot view monitor, which replaces a side mirror, is disabled.

In accordance with the present disclosure, there is provided a side camera for a vehicle, comprising: a main body disposed at a left-hand side and/or a right-hand side of the vehicle; a blind-spot view camera of which at least a portion is accommodated in the main body and which is configured to photograph a view in a lateral and rearward directions of the vehicle; a surround view camera (SVC) of which at least a portion is accommodated in the main body and which is configured to photograph a view in a lateral direction of the vehicle; and a blind-spot view monitor disposed inside the vehicle to transmit an image captured by the blind-spot view camera, wherein, when the blind-spot view camera fails, an image transformation process is performed based on an image captured by the SVC and transmitted to the blind-spot view monitor, and when the blind-spot view monitor fails, an image captured by the blind-spot view camera is transmitted to another display device in the vehicle other than the blind-spot view monitor.

In accordance with the present disclosure, there is provided a method for controlling a side camera for a vehicle which is switched to an emergency system when a blind-spot view camera or a blind-spot view monitor fails, the method comprising: a failure detecting operation of detecting whether the side camera fails; a notifying operation of, notifying an operator that the side camera for a vehicle is switched to the emergency system when it is determined that the side camera for a vehicle fails; a failure determining operation of determining whether the blind-spot view monitor fails; and a correction outputting operation of, performing a connection to another display device other than the blind-spot view monitor in a vehicle when it is determined that the blind-spot view monitor fails, and transforming an image by using an image captured by a surround view camera (SVC) disposed in a main body of the side camera for a vehicle and then outputting a corrected image to the blind-spot view monitor when it is determined that the blind-spot view monitor is not failed.

DETAILED DESCRIPTION

Figure 1:
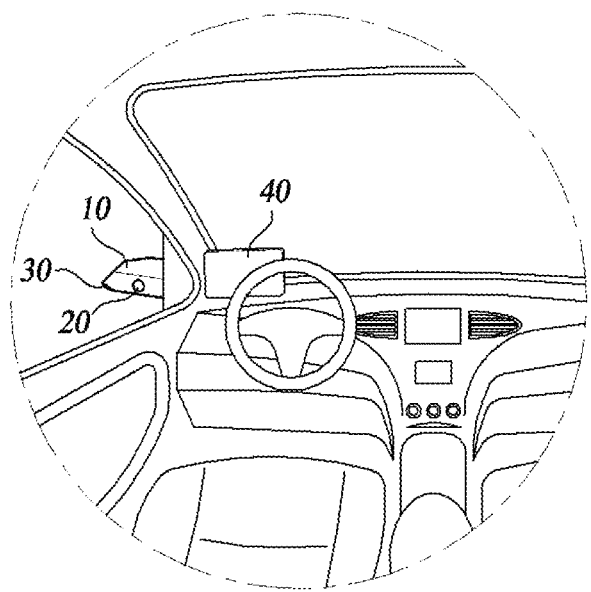
FIG. 1 is a perspective view of a vehicle on which a side camera for a vehicle is mounted according to one embodiment of the present disclosure.

Some embodiments of the present disclosure will now be described in detail with reference to the illustrative drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be made.

In describing the components of the embodiments according to the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

Figure 2:
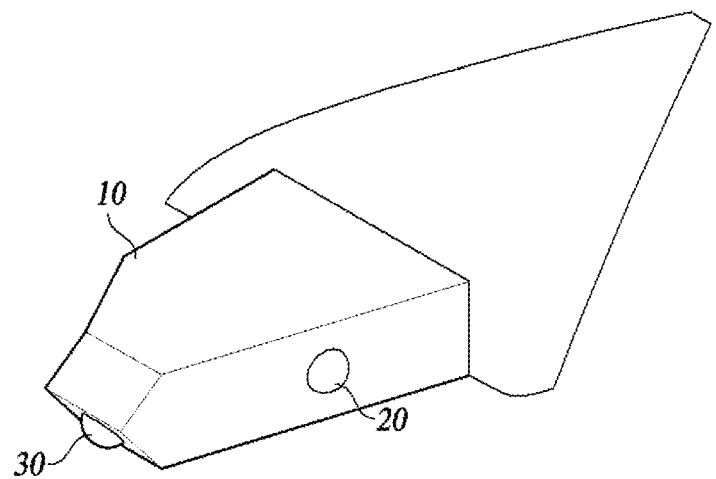
FIG. 2 is a perspective view of the side camera for a vehicle according to one embodiment of the present disclosure.
Figure 3:
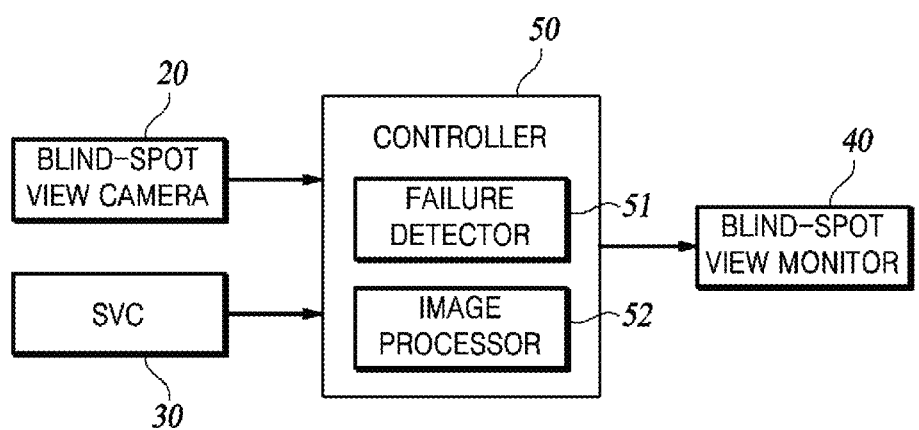
FIG. 3 is a block diagram of the side camera for a vehicle according to one embodiment of the present disclosure.
Figure 4:
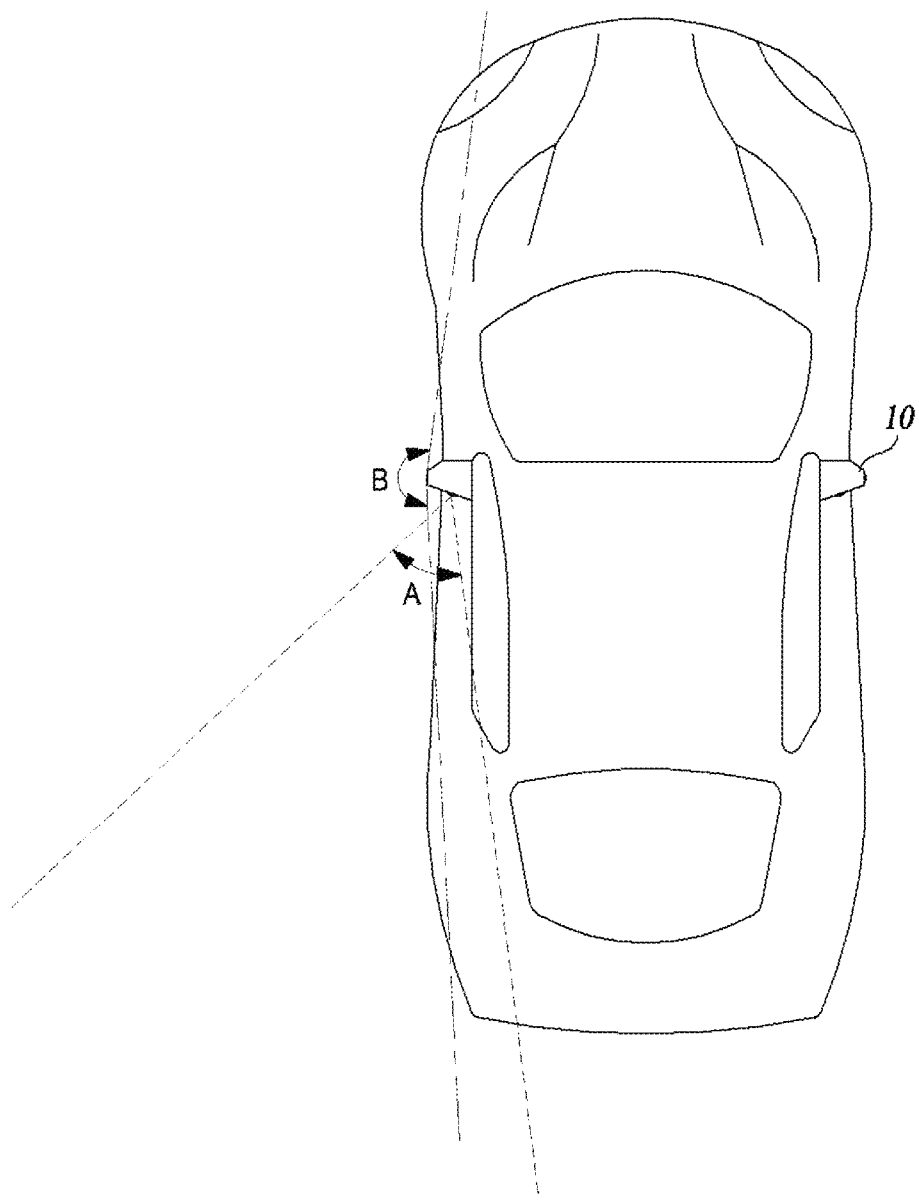
FIG. 4 is a view for describing fields of view (FOVs) of a blind-spot view camera and a surround view camera (SVC) disposed in the side camera for a vehicle.
Figure 5:
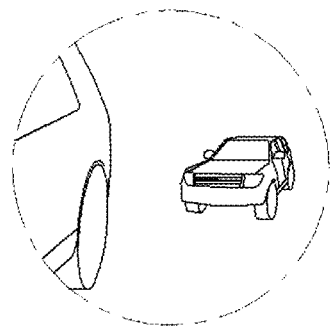
FIG. 5 shows images for describing a process of correcting an image captured by the SVC.
Figure 5:
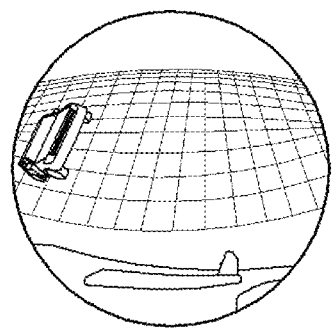
Figure 5:
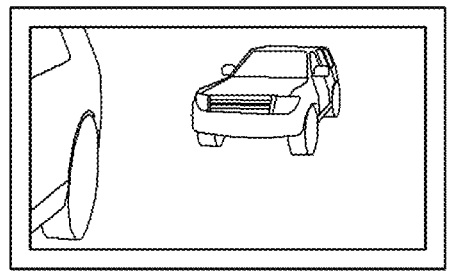

FIG. 1 is a perspective view of a vehicle on which a side camera for a vehicle according to one embodiment of the present disclosure is mounted. FIG. 2 is a perspective view of the side camera for a vehicle according to one embodiment of the present disclosure. FIG. 3 is a block diagram of the side camera for a vehicle according to one embodiment of the present disclosure. FIG. 4 is a view for describing fields of view (FOVs) of a blind-spot view camera and a surround view camera (SVC) disposed in the side camera for a vehicle. FIG. 5 shows images for describing a process of correcting an image captured by the SVC.

Referring to FIGS. 1 to 3, the side camera for a vehicle includes all or some of a main body 10, a blind-spot view camera 20, an SVC 30, a blind-spot view monitor 40, and a controller 50.

The main body 10 includes a housing space therein and is installed at each of left-hand and right-hand sides of a vehicle. The main body 10 may be formed as a streamlined type to minimize air resistance during traveling.

At least a portion of the blind-spot view camera 20 is accommodated in the main body 10 and configured to photograph a view in a lateral direction behind the vehicle. For example, as shown in FIG. 2, the blind-spot view camera 20 may be accommodated inside the main body 10. In order for the blind-spot view camera 20 to photograph a view in a lateral direction behind the vehicle, a lens of the blind-spot view camera 20 may be provided to face the rear side of the vehicle.

FIG. 4 shows angles of view of the blind-spot view camera 20 and the SVC 30. A horizontal field of view (HFOV) A of the blind-spot view camera 20 is in a range of 50° to 80°, and a vertical field of view (VFOV) thereof is in a range of 20° to 40°. Since the blind-spot view camera 20 is used to replace an existing side mirror, a rear side range, which is checkable by a driver during traveling, is increased about two-fold or more.

The SVC 30 is disposed in the main body 10 and designed to photograph an entire range of both views in a lateral direction from the vehicle. The SVC 30 may be disposed in the main body 10 to face a direction perpendicular to a longitudinal direction of the vehicle. Here, an HFOV B of the SVC 30 is in a range of 180° to 200°, and a VFOV thereof is in a range of 120° to 160°. The SVC 30 may photograph an entire range of a view in a lateral direction from the vehicle using a wide FOV. The SVC 30 is generally used to detect obstacles when parking a vehicle or traveling along a narrow road.

The blind-spot view monitor 40 is a display device which displays information about an image captured by the blind-spot view camera 20. That is, the blind-spot view monitor 40 and the blind-spot view camera 20 replace existing side mirrors for a vehicle. One blind-spot view monitor 40 is disposed at each of front left-hand and right-hand sides inside the vehicle to display an image captured by the blind-spot view camera 20 disposed at each of both sides of the vehicle.

The controller 50 is disposed inside the vehicle and is also referred to as an electronic control unit (ECU). The controller 50 includes a hardware processor and a memory, and commands for executing the controller 50 and a look-up table (LUT) are stored in the memory. However, the present disclosure is not limited thereto, and all configurations for controlling overall operations of the vehicle may be included. The controller 50 performs control to process an image captured by the blind-spot view camera 20 and transmit a screen to the blind-spot view monitor 40 and detects whether one or more of the blind-spot view camera 20 and the blind-spot view monitor 40 have failed. When a failure occurs in one or more of the blind-spot view camera 20 and the blind-spot view monitor 40, the controller 50 performs backup control using another display device other than the blind-spot monitor in the vehicle or the SVC 30 so as to secure a rear side field of view of the vehicle.

The controller 50 may include a failure detector 51 and an image processor 52. The failure detector 51 periodically detects a failure state of the blind-spot view camera 20 and the blind-spot view monitor 40. While an ignition of the vehicle is turned on, the failure detector 51 checks whether the blind-spot view camera 20 and the blind-spot view monitor 40 have failed at preset time intervals. When the failure detector 51 detects that one or more of the blind-spot view camera 20 and the blind-spot view monitor 40 have failed, the failure detector 51 transmits a failure detection signal to notify the image processor 52 of the failure. In addition, when the failure detector 51 detects a failure, a signal is transmitted to each device to notify a driver that the side camera for a vehicle is switched to an emergency system using a display device or a speaker device in the vehicle. The switch to the emergency system is performed by the image processor 52 to be described below. Although the blind-spot view monitor 40 is illustrated in FIG. 1 as being separately disposed at each of left-hand and right-hand sides in the vehicle, the present disclosure is not limited thereto, and the blind-spot view monitor 40 may be disposed anywhere as long as the driver can view the blind-spot view monitor 40 without any difficulty during driving.

The image processor 52 normally performs a calculation to process an image based on an image signal captured by the blind-spot view camera 20 and transmit a screen to the blind-spot view monitor 40. When the image processor 52 receives the failure detection signal of the blind-spot view camera 20 or the blind-spot view monitor 40 from the failure detector 51, the image processor 52 performs image processing in response to the failure detection signal.

When it is determined that the blind-spot view monitor 40 has failed, the image processor 52 transmits a screen of an image captured by the blind-spot view camera 20 to another display device other than the blind-spot view monitor 40 within a driver's field of view instead of the blind-spot view monitor 40.

When it is determined that the blind-spot view camera 20 has failed, the image processor 52 receives image information from the SVC 30 rather than the blind-spot view camera 20, extracts only information about a rear side from the image information of the SVC 30, and transforms and transmits the extracted information to the blind-spot view monitor 40. The SVC 30 is a wide angle camera, and thus, distortion of an image thereof occurs. In order for the driver to actually view a rear side of the vehicle with the blind-spot view camera 20, an undistortion process and a perspective transform process are required.

Referring to FIG. 5, a difference between an image of the blind-spot view camera 20 and an image of the SVC 30 can be confirmed. Part (a) of FIG. 5 is an image acquired by photographing a view in a lateral direction behind the vehicle with the blind-spot view camera 20, and part (b) of FIG. 5 is an image acquired by photographing an entire range of a view in a lateral direction from the vehicle with the SVC 30. Referring to part (b) of FIG. 5, the image is distorted so as to cover the entire range of the view in the lateral direction, and a rear side is a portion of the distorted image. When the distorted image is transmitted to a screen without any change, the driver cannot easily grasp information about the rear side during driving. Therefore, a rear side portion of the image captured by the SVC 30 is set as a region of interest (ROI), and an undistortion process and a perspective transform process are required for the set portion. After the image processor 52 completes such an image transformation process, an image is transformed as shown in FIG. 5. The image processor 52 transmits the transformed image to the blind-spot view monitor 40 to allow the driver to view the rear side of the vehicle even when the blind-spot view camera 20 has failed, thereby allowing the driver to avoid the risk of an accident. When the image processor 52 performs the undistortion process and the perspective transform process, a volume of operation processing is increased, and thus, a high-performance hardware processor is required. Therefore, the image processor 52 may be designed such that the preset LUT is stored in the memory of the controller 50 to transform an image based on the LUT. The LUT differs according to a mounting position of the blind-spot view camera 20 and the SVC 30 installed on the vehicle and a lens distortion ratio, and thus, a separate LUT should be set for each vehicle type.

Figure 6:
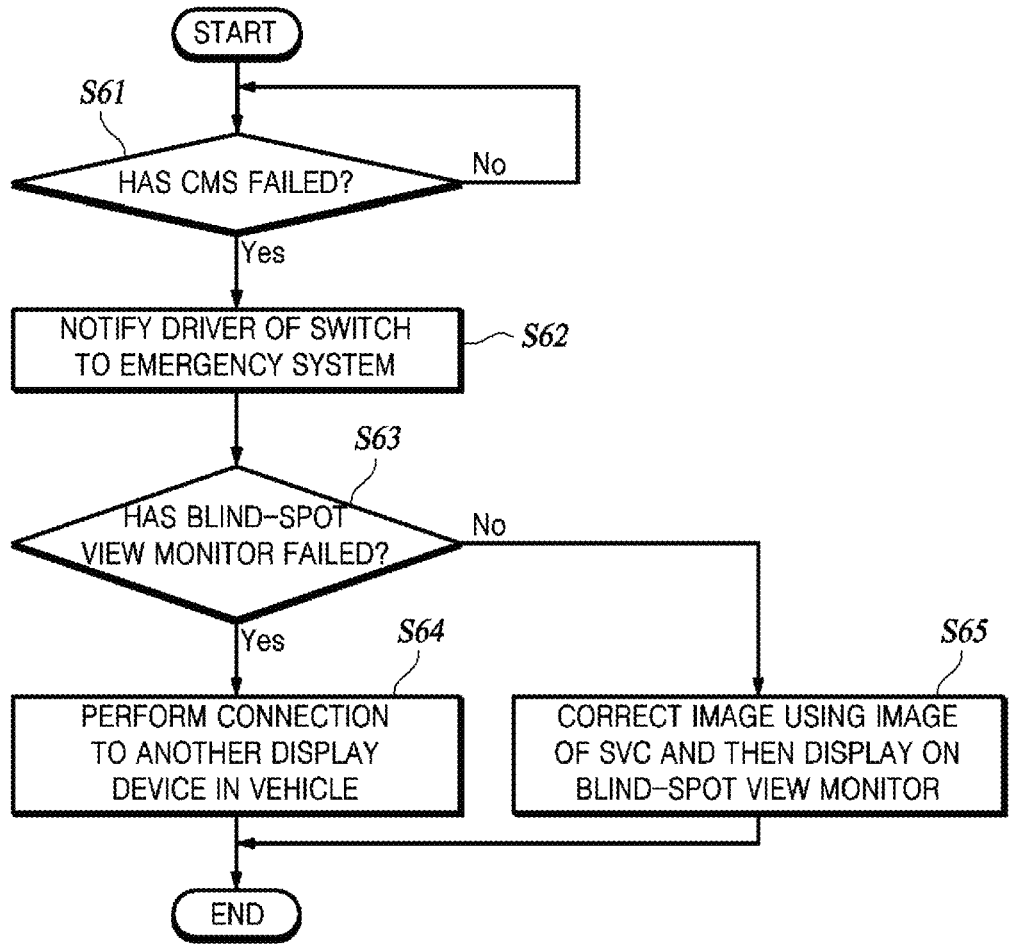
FIG. 6 is a flowchart of a method of controlling a side camera for a vehicle according to one embodiment of the present disclosure.

FIG. 6 is a flowchart of a method of controlling a side camera for a vehicle according to one embodiment of the present disclosure.

When an ignition of the vehicle is turned on, a controller 50 periodically detects whether a CMS has failed (S61). Here, the CMS is an abbreviation of camera monitoring system and refers to a system designed such that a driver may use a blind-spot view camera 20 and a blind-spot view monitor 40 to monitor a situation of a rear side of a vehicle.

When the failure of the CMS is not detected, the controller 50 does not proceed to a subsequent operation and periodically repeats operation S61 to detect whether the CMS has failed.

When the failure of the CMS is detected, the controller 50 first notifies the driver that a side camera for a vehicle is switched to an emergency system (S62). The switch to the emergency system may be visually or audibly notified using a display device or a speaker device within a driver's field of view in the vehicle. Operation S62 is not an operation that is necessarily performed after operation S61 and may be performed after operation S63 to be described below.

After the driver is notified of the switch to the emergency system, the controller 50 determines whether the blind-spot view monitor 40 has failed (S63). When the controller 50 determines that the blind-spot view monitor 40 has failed, a rear side image of the vehicle is transmitted to another display device other than the blind-spot view monitor in the vehicle rather than the blind-spot view monitor (S64). Here, another display device other than the blind-spot view monitor in the vehicle is a display device disposed within a driver's field of view. For example, another display device other than the blind-spot view monitor in the vehicle may be a digital cluster or a navigation display device disposed in a center fascia.

When the controller 50 determines that the blind-spot view monitor 40 has not failed, the controller 50 determines that a failure has occurred in the same place as the blind-spot view camera 20 rather than the blind-spot view monitor 40, corrects an image using an image of the SVC 30 rather than an image captured by the blind-spot view camera 20, and then, performs replacement to display the corrected image on the blind-spot view monitor 40 (S65). Since an FOV of the SVC 30 is greater than an FOV of the blind-spot view camera 20 and distortion occurs in an image captured by the SVC 30, a correction process should be performed. As described above, in an image captured by the SVC 30, a portion related to a rear side of the vehicle is set as an ROI, and the image captured by the SVC 30 is subjected to an undistortion process and a perspective transform process and transformed to look like an image captured by the blind-spot view camera 20. Since many calculations are required for the undistortion process and the perspective transform process, in order to reduce the cost of a hardware processor, an LUT may be stored in a memory to correct the image captured by the SVC 30. Since transformation coordinates are calculated in advance in the LUT, an image can be corrected through coordinate transformation only with information of the LUT without calculation.

After the setting for securing a driver's rear side field of view of the vehicle using operation S64 or S65 is completed, the present algorithm is ended.

Although operations are illustrated in FIG. 6 as being sequentially performed, this is merely an exemplary description of the technical idea of one embodiment of the present disclosure. In other words, those skilled in the art to which one embodiment of the present disclosure belongs may appreciate that various modifications and changes can be made without departing from essential characteristics of one embodiment of the present disclosure, that is, the sequence illustrated in FIG. 6 can be changed and one or more operations of the operations can be performed in parallel. Thus, FIG. 6 is not limited to the temporal order.

As described above, according to the present embodiment, in a side camera for a vehicle and a method of controlling the same, when a blind-spot view camera has failed, an image captured by an SVC is transformed and transmitted to a blind-spot view monitor, or when the blind-spot view monitor has failed, an image captured by the blind-spot view camera is transmitted to another display device other than the blind-spot view monitor in the vehicle, thereby safely securing a driver's a rear side field of view during driving.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Various embodiments of systems and techniques described herein can be realized by a programmable computer. Here, the computer includes a programmable processor, a data storage system (including a volatile memory, a non-volatile memory, another type of storage system, or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

What is claimed is:

1. A side camera for a vehicle, comprising:
    a main body disposed at a left-hand side and/or a right-hand side of the vehicle;
    a blind-spot view camera of which at least a portion is accommodated in the main body and being configured to photograph a view in a lateral and rearward directions of the vehicle;
    a surround view camera (SVC) of which at least a portion is accommodated in the main body and being configured to photograph a view in a lateral direction of the vehicle; and
    a blind-spot view monitor disposed inside the vehicle to transmit an image captured by the blind-spot view camera,
    wherein, when the blind-spot view camera fails, an image transformation process is performed based on an image captured by the SVC and transmitted to the blind-spot view monitor,
    when the blind-spot view monitor fails, an image captured by the blind-spot view camera is transmitted to another display device in the vehicle other than the blind-spot view monitor, and
    wherein, in the image transformation process, a rear side portion of the image captured by the SVC is set as a region of interest (ROI), and an undistortion process and a perspective transform process are performed upon the portion set as the ROI for correction thereof and a corrected image is transmitted to the blind-spot view monitor, the undistortion process and the perspective transform process being performed using a pre-stored look-up table based on mounting positions of the blind-spot view camera and the SVC and a corresponding lens distortion ratio.

2. The side camera of claim 1, further comprising:
    a failure detector that periodically detects a failure state of the blind-spot view camera and the blind-spot view monitor; and
    an image processor that performs a calculation to process an image based on an image signal captured by the blind-spot view camera and transmit a processed image to the blind-spot view monitor.

3. The side camera of claim 1, wherein, when a fail in one or more of the blind-spot view camera and the blind-spot view monitor is detected, an operator of the vehicle is notified that the side camera is switched to an emergency system through at least one of a display device and a speaker device in the vehicle.

4. The side camera of claim 1, wherein, the rear side portion is a portion which corresponds to a photographable range of the blind spot blind-spot view camera.

5. The side camera of claim 1, wherein a horizontal field of view (HFOV) of the blind-spot view camera is in a range of 50° to 80°, and
    an HFOV of the SVC is in a range of 180° to 200°.

6. The side camera of claim 1, wherein a vertical field of view (VFOV) of the blind-spot view camera is in a range of 20° to 40°, and
    a VFOV of the SVC is in a range of 120° to 160°.

7. The side camera of claim 1, wherein said another display device other than the blind-spot view monitor is at least one of a digital cluster and a navigation display device.

8. A method of controlling a side camera for a vehicle which is switched to an emergency system when a blind-spot view camera or a blind-spot view monitor fails, the method comprising:
    a failure detecting operation of detecting whether the side camera fails;
    a notifying operation of notifying an operator that the side camera for a vehicle is switched to the emergency system when it is determined that the side camera for a vehicle fails;
    a failure determining operation of determining whether the blind-spot view monitor fails;
    a correction outputting operation performing a connection to another display device other than the blind-spot view monitor in a vehicle when it is determined that the blind-spot view monitor fails, and transforming an image by using an image captured by a surround view camera (SVC) disposed in a main body of the side camera for a vehicle and then outputting a corrected image to the blind-spot view monitor when it is determined that the blind-spot view monitor is not failed;
    setting a rear side portion of the image captured by the SVC as a region of interest (ROI); and
    performing an undistortion operation and a perspective transform operation on the portion set as the ROI to correct and transmit the image to the blind-spot view monitor, the undistortion operation and the perspective transform operation being performed using a pre-stored look-up table based on mounting positions of the blind-spot view camera and the SVC and a corresponding lens distortion ratio.

9. The method of claim 8, wherein the rear side portion is a portion which corresponds to a photographable range of the blind-spot view camera.

10. The method of claim 8, wherein the notifying operation includes visually and audibly notifying the operator of the vehicle that the side camera for a vehicle is switched to the emergency system using at least one of a display device and a speaker device in the vehicle.

* * * * *